(12) United States Patent
Hoock

(10) Patent No.: US 9,376,297 B2
(45) Date of Patent: Jun. 28, 2016

(54) REACH TRUCK

(71) Applicant: NACCO Materials Handling Group, Inc., Fairview, OR (US)

(72) Inventor: Michael Hoock, Lonato (IT)

(73) Assignee: HYSTER-YALE GROUP, INC., Fairview, OR (US)

( * ) Notice: Subject to any disclaimer, the term of this patent is extended or adjusted under 35 U.S.C. 154(b) by 0 days.

(21) Appl. No.: 14/506,882

(22) Filed: Oct. 6, 2014

(65) Prior Publication Data

US 2015/0100210 A1    Apr. 9, 2015

(30) Foreign Application Priority Data

Oct. 7, 2013   (EP) .................................... 13187569

(51) Int. Cl.
*B66F 9/18*    (2006.01)
*B66F 9/20*    (2006.01)
*B66F 9/10*    (2006.01)
*B66F 9/22*    (2006.01)

(52) U.S. Cl.
CPC . *B66F 9/205* (2013.01); *B66F 9/10* (2013.01); *B66F 9/22* (2013.01)

(58) Field of Classification Search
CPC .............. B66F 9/22; B66F 9/205; B66F 9/10; E02F 9/2058; E02F 3/43; E02F 3/652
See application file for complete search history.

(56) References Cited

U.S. PATENT DOCUMENTS

| | | | |
|---|---|---|---|
| 4,182,126 A * | 1/1980 | Blakeslee | ........................ 60/459 |
| 4,305,123 A | 12/1981 | Scibor-Rylski | |
| 4,509,127 A | 4/1985 | Yuki et al. | |
| 4,517,645 A | 5/1985 | Yuki et al. | |
| 4,547,844 A | 10/1985 | Adams | |
| 4,634,332 A | 1/1987 | Kamide et al. | |
| 6,164,415 A * | 12/2000 | Takeuchi et al. | ............... 187/224 |
| 6,350,100 B1 * | 2/2002 | Naruse et al. | .................. 414/635 |

(Continued)

FOREIGN PATENT DOCUMENTS

| | | |
|---|---|---|
| EP | 1203745 B1 | 7/2005 |
| EP | 2508465 A1 | 10/2012 |

(Continued)

OTHER PUBLICATIONS

Extended European Search Report, Mar. 5, 2014.

(Continued)

*Primary Examiner* — Rodney Butler
(74) *Attorney, Agent, or Firm* — Schwabe, Williamson & Wyatt

(57) ABSTRACT

Reach truck 1 with a control system 2 for controlling the lowering movement of a fork 10, the control system 2 comprising a height sensor 20, for determining the lifting height h of the fork 10 of the reach truck 1, a proportional electrical hydraulic valve 50 connected to a lifting cylinder 70 of the reach truck 1, for controlling an oil flow of the lifting cylinder 70, and a control unit 30, connected to the height sensor 20 for receiving the actual lifting height h signal and controlling the proportional electrical hydraulic valve 50, wherein the control unit 30 automatically decreases the maximum lowering speed v of the fork 10, by controlling the proportional electrical hydraulic valve 50, according a predetermined maximum speed v curve depending on the lifting height h of the fork 10, and in some embodiments only on the lifting height h of the fork 10, such that the fork 10 is softly stopped at the ground.

20 Claims, 4 Drawing Sheets

(56) References Cited

U.S. PATENT DOCUMENTS

Figure 1:
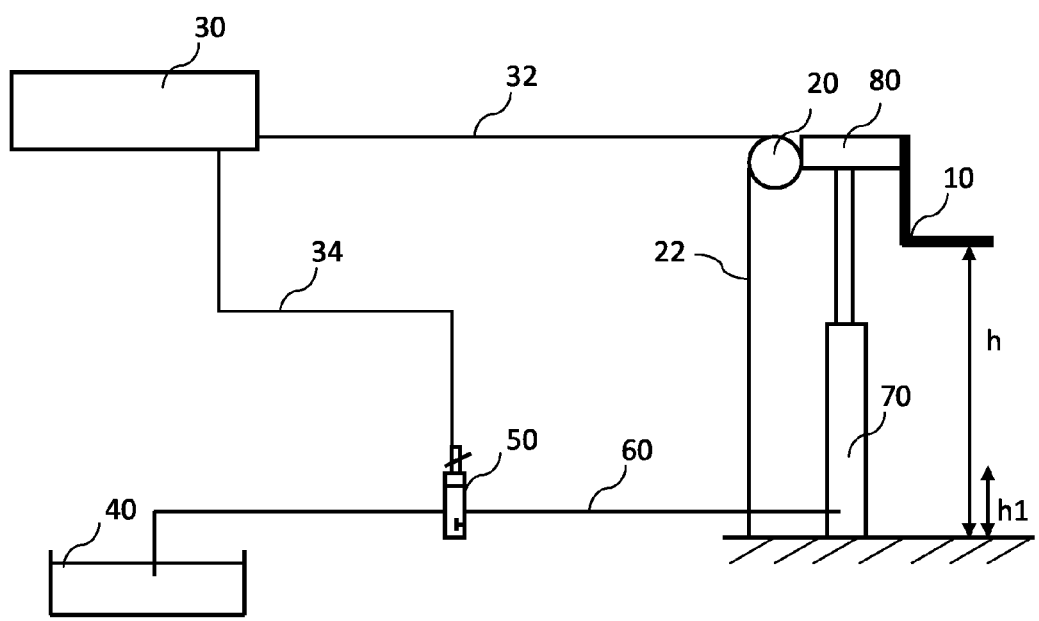

| 7,165,652 | B2 | 1/2007 | Allerding et al. | |
|---|---|---|---|---|
| 2005/0102081 | A1* | 5/2005 | Patterson | 701/50 |
| 2014/0260222 | A1* | 9/2014 | Yahner | 60/327 |
| 2014/0277958 | A1* | 9/2014 | Yahner et al. | 701/50 |

FOREIGN PATENT DOCUMENTS

| EP | 2263966 | B1 | 12/2012 | |
|---|---|---|---|---|
| JP | H072498 | A * | 1/1995 | |
| JP | 08290900 | A * | 11/1996 | B66F 9/24 |
| JP | 1982090900 | | 11/1996 | |

OTHER PUBLICATIONS

European Patent Office, Communication Pursuant to Article 94(3) EPC, Sep. 4, 2015.

* cited by examiner

REACH TRUCK

1. FIELD

The present disclosure relates to a forklift truck, such as a reach truck, with a control system for controlling the lowering movement of a fork. Reach trucks are generally known in the prior art as a specific and common type of forklift trucks and are designed for warehouse operations.

2. PRIOR ART

Industrial vehicles for manufacturing and warehouse operations are known in the prior art, such as for example forklift trucks. Forklift trucks usually comprise an extendable mast at which a fork for reaching and carrying the load is supported. In warehouse applications it is desired that only the mast and the fork—and not the complete truck—moves forward and backwards to reach the load from a warehouse rack. To this end reach trucks are known, which are particularly designed for this specific task. Reach trucks comprise for example a mast that is shift-able back and forth in respect to the frame of the reach truck. Movable mast reach trucks comprise hydraulic systems and allow for moving the entire mast with the forks. Further, the reach capability of reach trucks can be facilitated by other mechanisms, e.g. pantograph attachments.

The performance of reach trucks depends on various conditions, such as the reach capability, the lifting height and the stability. For example it is known from prior art that the stability of forklift trucks tends to decrease with increasing lifting height or increasing load weight. Further, the performance of reach trucks is determined also by the lifting and lowering speed of the fork. However, lowering the fork with high speed requires the operator to manually throttle back the speed of the fork as it approaches the ground in order to avoid an impact of the load on the ground. Such an impact is undesired since it might cause damages to handled loads, the reach truck and the ground, especially when heavy loads are handled.

In order to avoid such drawbacks control systems for other kind of forklift trucks are known in the prior art that have a soft stop technology for the fork's movement. Such systems, in general, try to decelerate the lowering speed of the fork before the end of the fork's movement.

The JPA 6 127 897 discloses a controller for a forklift, which can stop a fork at the highest position and the lowest position by controlling the supply and discharge quantity of the pressure liquid to/from a lift cylinder. The forklift truck comprises a control unit, a height meter and a flow quantity control valve. The control unit starts the control for soft stop of the flow quantity control valve when a difference between an output value of the height meter and the highest position or the lowest position decreases to a predetermined value or less.

The U.S. Pat. No. 4,634,332 discloses an automatic control system for loading and unloading a fork lift truck wherein the lifting and lowering speed of the fork is automatically controlled to be proportional to a difference of the actual height of the fork and the desired height of the fork.

Further JPA 4 153 200 A discloses a cargo protecting device for a forklift truck to minimize the collision shock on a lifting end by extinguishing the speed at the lifting end. The device comprises electromagnetic opening and closing valves, a pressure sensor and a lift height sensor. The larger the load, the lower the lift height will be when deceleration starts.

Moreover, the documents EP 1 203 745 A1, DE 10 305 671 A1 and GB 2 095 861 A disclose other control systems for forklift trucks. The lifting speed is adjusted depending on operational parameters, for example lifting height and/or load weight. The maximal lowering speed is decreased with decreasing lifting height. Before reaching an end position, the forks are softly stopped by decelerating the lifting speed.

However, such control systems have the disadvantage that the lowering speed of the fork depends on the load weight. The heavier the load the faster the lowering speed will be. In other approaches the deceleration of the fork's movement is done at a higher position with heavier loads.

Some embodiments of the present invention provide a control system for reach trucks that controls the lowering speed of the fork in a more efficient manner, facilitates operation of the reach truck and minimizes fork operation times.

3. SUMMARY OF THE INVENTION

Particularly, the above-mentioned problems are solved by a forklift truck, and in particular a reach truck, with a control system for controlling the lowering movement of a reach truck, wherein the control system comprises a height sensor, for determining the lifting height of the fork of the reach truck, a proportional electrical hydraulic valve connected to a lifting cylinder of the reach truck, for controlling an oil flow of the lifting cylinder, a control unit, connected to the height sensor, for receiving the actual lifting height signal and controlling the proportional electrical hydraulic valve, wherein the control unit automatically decreases the maximum lowering speed of the fork, by controlling the proportional electrical hydraulic valve, according a predetermined maximum speed curve depending on the lifting height of the fork, such that the fork is softly stopped at the ground. In some embodiments, the control unit automatically decreases the maximum lowering speed of the fork, by controlling the proportional electrical hydraulic valve, according a predetermined maximum speed curve depending only on the lifting height of the fork, such that the fork is softly stopped at the ground.

Since the control unit is connected to both the height sensor and the proportional electrical hydraulic valve, the control unit is capable of directly, efficiently and quickly controlling the actual lowering speed. The height sensor measures the actual lifting height of the fork and transmits the measured lifting height signal to the control unit. The control unit receives the actual height signal and controls a proportional electrical hydraulic valve in accordance with a predetermined maximum speed curve. The proportional electrical hydraulic valve can adopt any desired opening diameter and can proportionally control the flow of hydraulic fluid flowing through it. Thus it can precisely control the amount of hydraulic fluid flowing out of the lifting cylinder during lowering of the fork.

The maximum lowering speed of the fork is only dependent on the actual height signal as an operational parameter. Effects of the actually carried load are totally compensated. The lowering speed of the fork is thus load-independent. The actual maximum lowering speed is decreased only shortly before the ground according the predetermined speed vs. lifting height curve. The fork is softly stopped at the ground by controlling the proportional hydraulic valve. In this way, an uncontrolled impact of the fork on the ground and its negative effects on the load are prevented. The control unit limits the maximum possible lowering speed of the fork independent from the input of the operator. Thus, the operator may simply lower the fork with full speed and the control unit overrides the operator's signals below a predetermined lifting height. This facilitates the operation of the fork lift truck, minimizes the time for lowering the fork and simultaneously prevents any damages to fork and load. In addition, compared to the prior art no further operational parameters and corresponding sensors are required for the calculation of the control signals to the proportional electrical hydraulic valve, thereby allowing for a cost efficient and reliable control system.

In a preferred embodiment, the proportional electrical hydraulic valve is arranged within a hydraulic return line of the lifting cylinder. For the lowering of the fork the pressure within the hydraulic lifting cylinder and the oil flow out of the lifting cylinder needs to be controlled. Of course, the reach truck may comprise a plurality of lifting cylinders, usually two, which are arranged in parallel. Herein these are designated commonly as lifting cylinder. The proportional electrical hydraulic valve controls the flow of hydraulic oil from the lifting cylinder to a hydraulic liquid tank during the lowering of the fork.

In a further preferred embodiment, the height sensor is an encoder that generates digital height signals. The encoder measures the lifting height of the fork and converts the measured height into digital electrical signals. These digital height signals are used by the control unit to calculate the control signals to the proportional electrical hydraulic valve for operation.

In a further preferred embodiment, the control unit controls the maximum lowering speed of the fork independently from the load carried by the fork. In comparison to the prior art, the maximum lowering speed is decreased and controlled in accordance with a predetermined speed curve only, which comprises the height as single operational dependent parameter. No other input parameters are used, such as load, thereby preventing corresponding sensors and time consuming recalculations after changes or adaptations of the load.

Preferably, the control unit starts decreasing the maximum lowering speed of the fork when the lifting height of the fork falls below a predetermined value. Accordingly, the control unit starts the soft stop control upon the fork reaches a predefined lifting height value. In other words, the control system is in a normal operation mode with lifting heights greater than or equal to the predefined lifting height value and switches to soft stop control mode at lifting heights lower than this value. In both modes the lifting height of the fork can be controlled manually by the operator, however, the control system of the present invention limits the maximum lowering speed achievable by manual operator control in a certain range of the lifting height. In the soft stop control mode the control unit overrides the manual control signals of the operator if they exceed the predetermined maximum speed for the particular lifting height.

In a preferred embodiment, the predetermined maximum speed curve of the fork below the predetermined value decreases in an exponential manner. Accordingly, the maximum lowering speed of the fork is decreased exponentially during soft stop control operation.

The above mentioned problems are also solved by a method for controlling the lifting movement of a fork of a reach truck, the method comprising following steps:
 a. determining the lifting height of the fork of the reach truck by means of a height sensor;
 b. receiving the actual lifting height signal by means of a control unit; and
 c. controlling a proportional electrical hydraulic valve for controlling an oil flow of a lifting cylinder of the reach truck by means of said control unit; wherein
 d. the maximum lowering speed of the fork is automatically decreased, by controlling the proportional electrical hydraulic valve, according a predetermined maximum speed curve depending only on the lifting height of the fork, such that the fork is softly stopped at the ground.

By this method the same advantages are achieved as mentioned above. Due to the predetermined maximum speed curve, which is only dependent on the lifting height, the lowering of the fork can be done efficiently and fast without any impact of the fork on the ground. Further, operation of the reach truck is facilitated since the operator may simply lower the fork with full speed and does not need to manually decelerate the movement when reaching the ground.

Preferably, the steps of controlling the lowering of the fork are performed independently from the load carried by the fork. As mentioned above, the control system controls the maximum lowering speed only depending on the lifting height, but independent from other operational parameters.

Preferably, the decreasing of the lowering speed of the fork is automatically started when the lifting height of the fork falls below a predetermined value. As previously mentioned, the control system comprises two operational modes, normal operation and soft stop control below a predetermined threshold of the lifting height of the fork.

Preferably, the predetermined maximum speed curve of the fork decreases in an exponential manner when the lifting height of the fork falls below the predetermined value. An exponential speed curve maximizes the maximum possible lowering speed of the fork and ensures a time efficient lowering but soft stopping to the ground.

4. SHORT DESCRIPTION OF THE DRAWINGS

Figure 2:
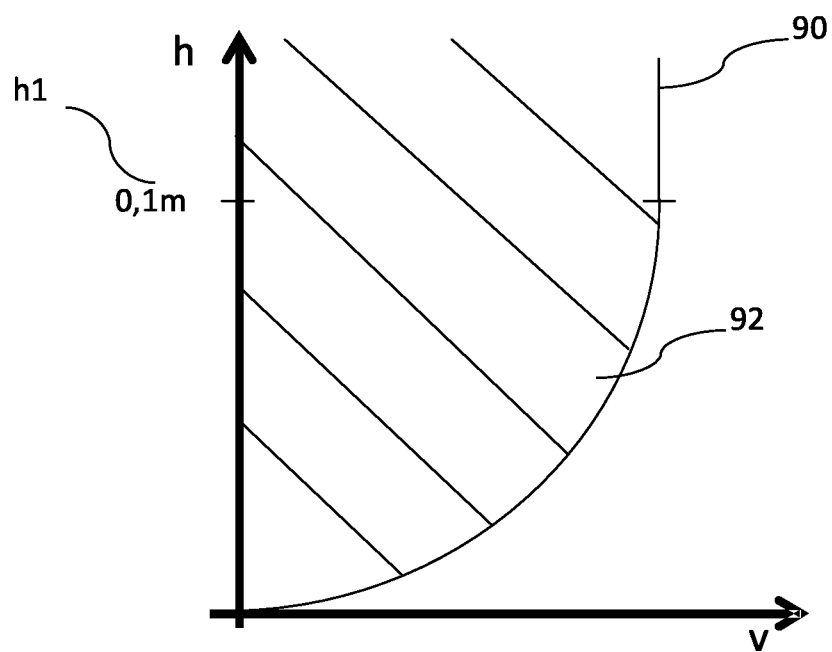
Figure 3:
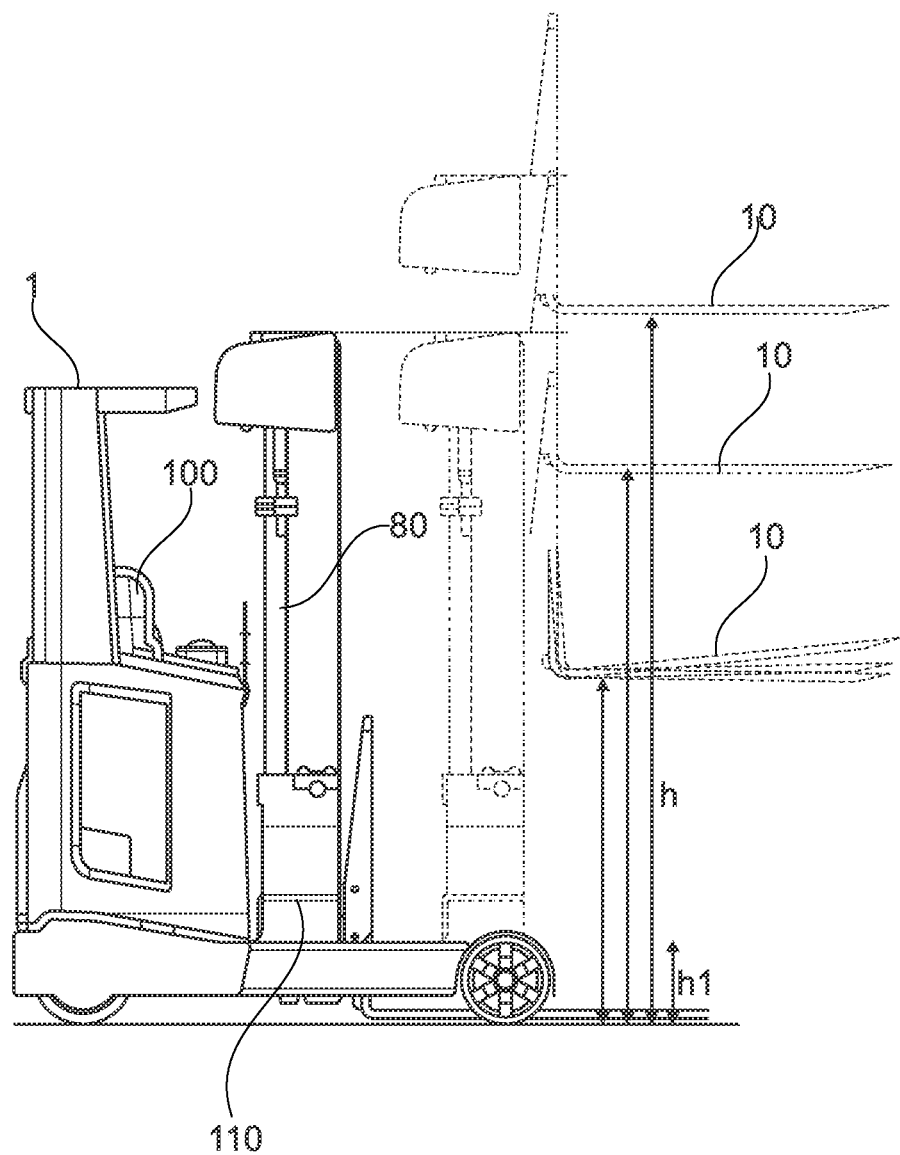

In the following preferred embodiments of the invention are described by the use of the accompanying figures. In which shows:

FIG. 1 a schematic view of a preferred embodiment of a control system of a reach truck according to the invention;

FIG. 2 a graphical representation of a preferred embodiment of a predetermined maximum speed curve;

FIG. 3 a front view of a preferred embodiment of a reach truck; and

Figure 4:
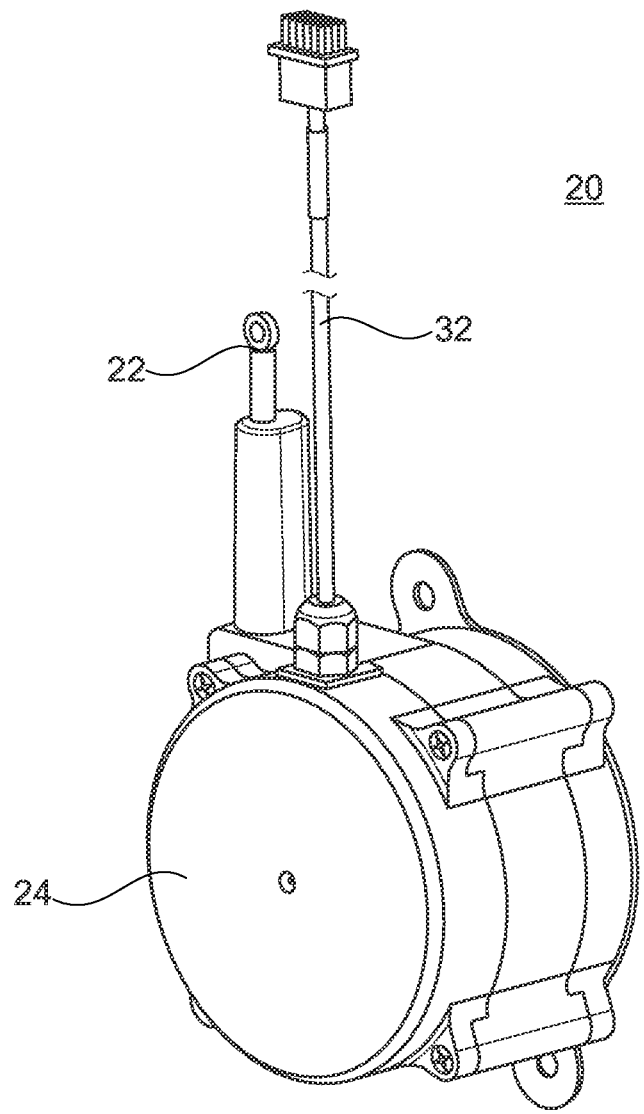

FIG. 4 a three dimensional view of a preferred embodiment of a height sensor.

5. DESCRIPTION OF PREFERRED EMBODIMENTS

In the following, preferred embodiments of the invention are explained in detail described with reference to the figures.

A reach truck 1 which comprises a control system 2 is illustrated in FIG. 3. The reach truck 1 comprises an extendable mast 80 which carries a fork 10. The mast 80 of the reach truck 1 can be shifted back and forth by means of a mast trolley 110 as it is illustrated in FIG. 3 in dashed lines. This reach movement of the mast 80 enables that the fork 10 can reach below a pallet of goods (not shown) without moving the entire reach truck 1. The reach movement can be realized also by other means like a shift-able fork 10 for example by means of a pantograph arrangement.

An operator sitting in the operator cabin 100 steers and manually controls the reach truck 1. Particularly the operator manually controls the lowering speed v of the fork 10 in the normal operation mode. As time is critical the operator usually tries to lower the fork 10 as fast as possible. However, this requires that the operator manually decelerates the lowering speed of the fork when reaching the ground in order to avoid any impact of the fork or load on the ground. Only very experienced operators do not loose time when lowering the fork to the ground. To improve lowering time a control system 2 is provided that limits the maximum lowering speed of the fork independent from operator control below a predetermined threshold height h1 of the fork. Exemplary lifting heights h and the threshold h1 in which the soft stop are indicated in FIG. 3 by arrows.

FIG. 1 shows a schematic illustration of the control system 1 of the reach truck 2. The control system 1 comprises a control unit 30 for evaluating the fork's height and controlling its velocity. The control unit 30 may be integrated in the board electronics or board computer of the reach truck. In other embodiments the control unit 30 is a separate electronics module. The control unit 30 usually comprises a CPU, RAM and ROM memory and the required input and output interfaces for sensors and actors.

Said control unit 30 is connected to a height sensor 20 by a first transmission line 32. The height sensor 20 measures or determines the actual height of the fork 10 and converts the determined lifting height h into digital height signals. The height sensor 20 may be a mechanical-electrical encoder and in particular a cable-extension position transducer with a measuring rope 22, as shown in FIG. 4. Such a height sensor 20 measures the height of the fork by pulling a thin rope 22 from a spool within a main body 24 and by measuring the movement of the spool. For measuring the fork's height h the height sensor's main body 24 is attached to a fixed part of the mast and the end of the rope 22 is attached to the fork 10. This allows for efficient and reliable measuring of the fork's height h and generating digital height signal for transmission via the first transmission line 32 to the control unit 30.

The the control unit 30 calculates from the received height signals the height and the actual speed of the fork 10 and compares these values with a predetermined maximum speed vs. height curve 90 that is stored within the control unit 30. The speed vs. height curve 90 can be configured by parameters as desired by the operator.

The control unit 30 further calculates electrical control signals for a proportional electrical hydraulic valve 50 which is connected to the control unit 30 via a second transmission line 34. If the actual speed of the fork 10 is higher than the desired speed according the maximum speed vs. height curve 90 then the control unit 30 closes the proportional electrical hydraulic valve 50 to some extent to decrease the oil flow out of the lifting cylinder 70. If the actual speed of the fork 10 then falls below the desired speed according to the maximum speed vs. height curve 90—and if the operator selects a higher speed—the control unit 30 opens the proportional electrical hydraulic valve 50 to some extent to increase the oil flow out of the lifting cylinder 70. As the actual speed of the fork 10 is determined preferably many times a second the control unit 30 can control the proportional electrical hydraulic valve 50 at the same frequency in order to follow the maximum speed vs. height curve 90 by slightly closing and opening the proportional electrical hydraulic valve 50.

The proportional electrical hydraulic valve 50 is arranged within a hydraulic return line 60 of one or more lifting cylinder(s) 70 to a hydraulic oil tank 40. For the lowering of the fork 10 the oil flow out of the lifting cylinder 70 needs to be controlled. The proportional electrical hydraulic valve 50 sets the flow of hydraulic oil from the lifting cylinder 70 to the hydraulic oil tank 40 during the lowering of the fork 10. This is achieved by adopting any desired opening diameter in the proportional electrical hydraulic valve 50 in accordance with the received control signals from the control unit 30. Thereby, the control unit 30 controls the lowering speed v and height h of the fork 10 for a soft stop on the ground. The oil flow from the lifting cylinder 70 is dependent on the opening diameter of the proportional electrical hydraulic valve 50 and on the pressure of the oil within the lifting cylinder 70 which is again dependent on the load weight carried by the fork 10. Thus the control unit 30 closes and opens the proportional electrical hydraulic valve 50 according the above mentioned speed control algorithm to compensate for different load weights and to keep the lowering speed of the fork 10 within the desired speed range 92 depending on the lifting height h.

When the actual lifting height h reaches a predefined threshold value h1 the control unit 30 starts automatically decreasing the maximum possible lowering speed v of the fork 10 in accordance with a predetermined maximum speed curve 90. Then the control unit 30 switches from normal operation mode to the soft stop control mode. Accordingly, the operator is not capable of manually selecting the maximum lowering speed v of the fork 10 any more since the manual input signals are overwritten by the control unit 30. The control unit 30 limits the maximum possible lowering speed of the fork 10 to the values stored in the predetermined maximum speed curve.

The predetermined maximum speed curve 90 shows in FIG. 2 the maximum lowering speed v on the X-axis and the lifting height h on the Y-axis. Below a predetermined threshold value h1 the curve 90 falls exponentially to zero. As shown in FIG. 2 an exemplary threshold value h1 would be 0.1 m. Accordingly as explained above, the soft stop control mode is activated when the fork 10 is lowered below this fork height. Then the control unit 30 controls the hydraulic oil flow out of the lifting cylinder 70 with the proportional electrical hydraulic valve 50 so that the maximum lowering speed v corresponds to the curve 90. Thus the fork 10 is softly stopped at the ground even if the operator selects full fork lowering speed.

Of course the operator may select to lower the fork even slower as the maximum speed defined by curve 90. The shaded area 92 of the diagram of FIG. 2 indicates the possible speed range.

LIST OF REFERENCE SIGNS 1 control system
2 reach truck
10 fork
20 height sensor
22 rope
24 main body
30 control unit
32 transmission line for electrical lifting height signals
34 transmission line for valve control signals
40 hydraulic oil tank
50 proportional electrical hydraulic valve
60 hydraulic return line of the lifting cylinder
70 lifting cylinder
80 mast of the reach truck
90 maximum lowering speed
92 possible lowering speed range
100 operator cabin
110 mast trolley
h lifting height
h1 predetermined threshold lifting height value
v lowering speed

The invention claimed is:

1. A control system for controlling the lowering movement of a fork, the control system comprising:
   a height sensor configured to determine the lifting height of the fork of a forklift truck and to transmit a lifting height signal;
   a proportional electrical hydraulic valve connected to a lifting cylinder of the forklift truck and configured to control an oil flow of the lifting cylinder; and
   a control unit operably connected to the height sensor for receiving the lifting height signal, wherein a speed of the fork is determined from the lifting height signal, and wherein
   the control unit automatically decreases a maximum lowering speed of the fork by controlling the proportional electrical hydraulic valve based on a comparison of both the lifting height of the fork and the speed of the fork to a predetermined maximum speed curve, such that the fork is softly stopped at the ground.

2. A control system according to claim 1, wherein the proportional electrical hydraulic valve is arranged within a hydraulic return line of the lifting cylinder.

3. A control system according to claim 1, wherein the height sensor is an encoder that generates digital height signals.

4. A control system according to claim 1, wherein the control unit controls the maximum lowering speed of the fork independently from a load carried by the fork.

5. A control system according to claim 1, wherein the control unit starts decreasing the maximum lowering speed of the fork when the lifting height of the fork falls below a predetermined value.

6. A control system according to claim 1, wherein
   the control unit determines the speed of the fork based, at least in part, on the received lifting height signal.

7. A control system according to claim 2, wherein the height sensor is an encoder that generates digital height signals.

8. A control system according to claim 2, wherein the control unit controls the maximum lowering speed of the fork independently from a load carried by the fork.

9. A control system according to claim 2, wherein the control unit starts decreasing the maximum lowering speed of the fork when the lifting height of the fork falls below a predetermined value.

10. A control system according to claim 4, wherein the control unit starts decreasing the maximum lowering speed of the fork when the lifting height of the fork falls below a predetermined value.

11. A control system according to claim 5, wherein the predetermined maximum speed curve of the fork decreases in an exponential manner when the lifting height of the fork falls below the predetermined value.

12. A method for controlling the lowering movement of a fork of a forklift truck, the method comprising:
   generating a lifting height signal for the fork of the forklift truck via a height sensor;
   receiving the lifting height signal via a control unit;
   via the control unit, determining a lifting height of the fork based on the lifting height signal;
   determining a speed of the fork;
   comparing both the lifting height of the fork and the speed of the fork to a predetermined maximum speed curve; and
   controlling an oil flow of a lifting cylinder of the forklift truck via signals sent from the control unit to a proportional electrical hydraulic valve to
   automatically decrease a maximum lowering speed of the fork by controlling the proportional electrical hydraulic valve based on comparing both the lifting height of the fork and the speed of the fork to a predetermined maximum speed curve, such that the fork is softly stopped at the ground.

13. A method according to claim 12, wherein the step of controlling an oil flow and the step of automatically decreasing a maximum lowering speed of the fork are performed independently from a load carried by the fork.

14. A method according to claim 12, wherein the decreasing of the maximum lowering speed of the fork is automatically started when the lifting height of the fork falls below a predetermined value.

15. A method according to claim 12, wherein the predetermined maximum speed curve of the fork decreases in an exponential manner.

16. A method according to claim 12, wherein the speed of the fork is determined by the control unit based, at least in part, on the lifting height signal.

17. A method according to claim 12, further comprising, via the control unit, configuring the predetermined maximum speed curve in response to receiving parameters at the control unit.

18. A method according to claim 13, wherein the decreasing of the maximum lowering speed of the fork is automatically started when the lifting height of the fork falls below a predetermined value.

19. A method according to claim 13, wherein the predetermined maximum speed curve of the fork decreases in an exponential manner.

20. A method according to claim 14, wherein the predetermined maximum speed curve of the fork decreases in an exponential manner when the lifting height of the fork falls below the predetermined value.

* * * * *